United States Patent [19]

Wild

[11] Patent Number: 4,754,598
[45] Date of Patent: Jul. 5, 1988

[54] BOTTLE PACKING APPARATUS

[76] Inventor: Anton J. Wild, 182 Blvd., Kenilworth, N.J. 07033

[21] Appl. No.: 112,810

[22] Filed: Oct. 23, 1987

[51] Int. Cl.$^4$ ............................................. B65B 21/06
[52] U.S. Cl. ........................................ 53/497; 53/247; 53/495
[58] Field of Search ................. 53/497, 496, 495, 493, 53/247, 539, 158, 248; 294/87.26, 87.2

[56] References Cited

U.S. PATENT DOCUMENTS

| | | |
|---|---|---|
| 1,808,689 | 6/1931 | Stenhouse et al. |
| 2,686,623 | 8/1954 | Wimmer et al. |
| 2,701,085 | 2/1955 | Davis |
| 2,727,664 | 12/1955 | Ardell |
| 2,730,279 | 1/1956 | Enock |
| 2,863,579 | 12/1958 | Meyer |
| 2,952,955 | 9/1960 | Leichenich et al. ................ 53/497 |
| 3,057,136 | 10/1962 | Walter ................................ 53/262 |
| 3,174,791 | 3/1965 | Dardaine ......................... 294/87.24 |
| 3,244,303 | 4/1966 | Conner |
| 3,411,636 | 11/1968 | Wallis |
| 3,479,791 | 11/1969 | Wild ................................... 53/497 |
| 3,754,667 | 8/1973 | Storch |
| 4,169,342 | 10/1979 | Hartness et al. .................. 53/248 |
| 4,206,941 | 6/1980 | Wild ................................ 294/87.26 |
| 4,248,029 | 2/1981 | Hartness et al. .................. 53/248 |
| 4,325,208 | 4/1982 | Barker ............................ 53/497 X |
| 4,432,189 | 2/1984 | Raudat .............................. 53/497 |
| 4,512,134 | 4/1985 | Robinson et al. ................. 53/248 |
| 4,570,413 | 2/1986 | Raudat .............................. 53/247 |
| 4,590,744 | 5/1986 | McGill .............................. 53/497 |
| 4,608,804 | 9/1986 | Wild ................................... 53/262 |

FOREIGN PATENT DOCUMENTS 861057 2/1961 United Kingdom .

Primary Examiner—James F. Coan
Attorney, Agent, or Firm—Sperry, Zoda & Kane

[57] ABSTRACT

The present invention provides a bottle packing apparatus wherein bottles are packed by simultaneous movement together of the array of bottles and the case. The bottles are packed from a conventional infeed conveyor and are divided into rows by the use of lane dividers. Bottle guiding plates define guiding channels which compress the rows of bottles toward the center of line of a conveyor. This compressed grouping of rows are then urged into a neck holding means which includes a suspension carriage carrying a first and second bar movable with respect thereto and defining bottle suspension slots for retaining the bottles in the neck area thereof. A sensing device is positioned adjacent the neck holding means which will initiate downward movement of the suspension carriage when the bottle suspension slots are sensed to a completely full condition and, simultaneously, a platform positioned therebelow carrying the case into which the bottles are to be packed moves upwardly for conflux movement between the suspension carriage and the platform. Once the bottles are placed in position within the case the first and second bars of the neck holding means separate releasing the bottles. The platform then moves downwardly and the suspension carriage moves upwardly for recycling.

20 Claims, 3 Drawing Sheets

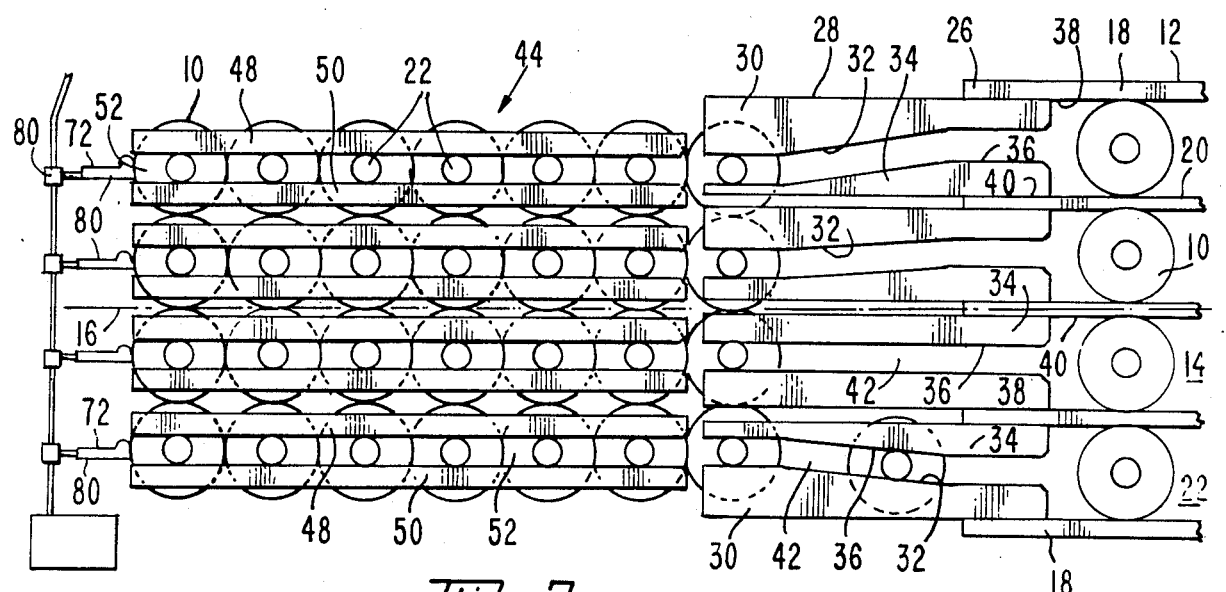
Fig_2_
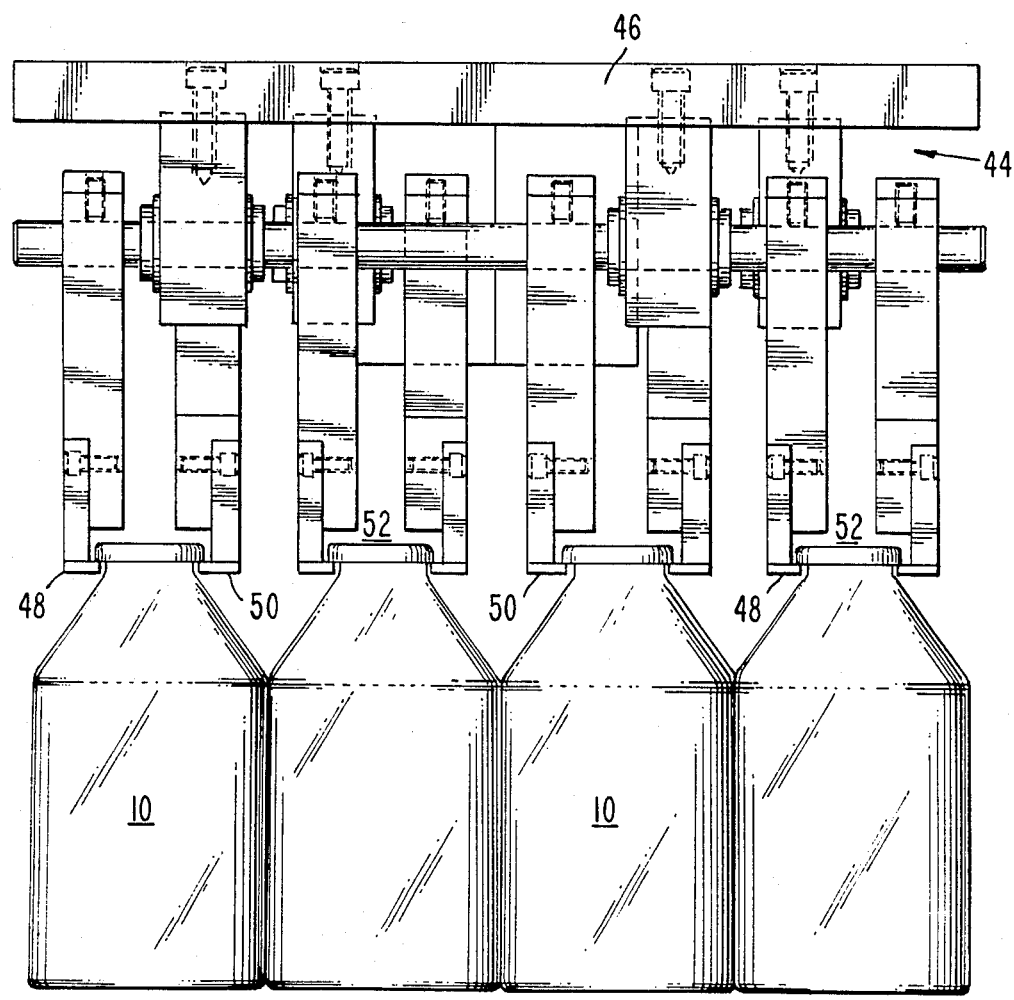
Fig_4_

BOTTLE PACKING APPARATUS

BACKGROUND OF THE INVENTION

1. Field Of The Invention

The present invention deals with the field of devices for packing of bottles randomly oriented. Normally such bottles must be packed after filling, capping and labeling thereof. These bottles are randomly configured upon a conveyor and must be aligned into rows divided into packing sections corresponding to the case that will receive the rows and moved to the position of the case for packing therein.

2. Description Of The Prior Art

Examples of such packing apparatus are shown in U.S. Pat. No. 1,808,689 issued June 2, 1931 to T. Stenhouse et al on a Transfer Apparatus; U.S. Pat. No. 2,863,579 issued Dec. 9, 1958 to G. Meyer on a Case Unloader With Bottle Rejecting Head; U.S. Pat. No. 2,952,955 issued Sept. 20, 1960 to H. Leichenich et al on a Bottle Packing Machine; U.S. Pat. No. 4,169,342 issued Oct. 2, 1979 to T. Hartness et al on an Article Separating Device For Case Loading Machine; U.S. Pat. No. 4,248,029 issued Feb. 3, 1981 to T. Hartness et al on a Case Packer Loading Device; U.S. Pat. No. 4,512,134 issued Apr. 23, 1985 to M. Robinson et al on a Universal Type Packing Head; U.S. Pat. No. 4,570,413 issued Feb. 18, 1986 to J. Raudat on a Case Packer With Load Decelerating And Impact Absorbing Means; and British Pat. No. 861,057 published Feb. 15, 1961 To Dawson Bros., Limited on Improvements Relating To Bottle Lifting And Lowering Mechanism.

SUMMARY OF THE INVENTION

The present invention provides a bottle packing apparatus including a bottle supply means having a conveyor for carrying bottles to be packed. The conveyor can define a center line extending longitudinally down the middle thereof. A bottle divider means is positioned immediately above the conveyor and basically includes a plurality of divider members which extend parallel to the direction of movement of the conveyor in order to divide the bottles into several longitudinally extending rows or orientation.

A bottle guiding means is positioned at the downstream end of the bottle supply and includes a plurality of bottle guides positioned adjacent to each downstream end of each of the longitudinally extending rows in order to receive the bottles therefrom for condensing of the array thereof.

The bottle guiding means includes a first plate positioned adjacent to the wall of the bottle divider which is outermost with respect to the center line of the conveyor. This first plate extends horizontally and defines an outer guiding edge thereadjacent spatially disposed from the outermost bottle divider. Bottles supplied thereto are adapted to abut the outer guiding edge to be guided thereby.

The bottle guiding means also includes a second plate means adjacent to the wall of the innermost bottle divider defining this row with the second plate extending horizontally and defining an inner guiding edge thereadjacent spatially disposed outwardly from the innermost adjacent bottle divider. The inner guiding edge is positioned in spaced relation from the outer guiding edge to define a guiding channel therebetween for receiving bottles and urging the row corresponding to that section toward the center line. This guiding channel will be defined by an inner guiding edge and an outer guiding edge which are preferably parallel with respect to one another in such a manner as to define a constant lateral dimension such as to receive and retain the neck area of bottles therein for urging condensing of the array.

Once the lateral dimension of the rows of bottles is decreased by the bottle guiding means a neck holding means will be positioned to receive this condensed array of bottles. The neck holding means is preferably positioned adjacent the downstream end of the bottle guiding means and includes a suspension carriage positioned thereadjacent which is vertically movable with respect to the bottle guiding means. A plurality of first suspension bars are mounted in such a manner as to be laterally movable with respect to the suspension carriage. A plurality of second suspension bars are also laterally movably mounted with respect to the suspension carriage and are positioned adjacent to one each of the first suspension bars. In this manner the first and second suspension bars cooperate with respect to one another to define a bottle suspension slot therebetween which is positioned immediately adjacent the downstream end of the guiding channels of the bottle guiding means to receive rows of bottles therefrom as the conveyor means urges bottles therealong. The first suspension bar and the second suspension bar are laterally movable toward each other to be in a bottle holding position and away from each other to be in a bottle releasing position.

A carriage drive is operatively mounted with respect to the suspension carriage and the neck holding means to cause movement thereof between a top position with the bottle suspension slots adjacent the downstream ends of the guiding channel and a bottom position located vertically downwardly therefrom to facilitate releasing of bottles retained within the bottle suspension slots immediately adjacent to a case positioned therebelow.

A platform is positioned below the suspension carriage means and is adapted to receive bottles thereon. The bottles can be received directly onto the platform or can be received into a case positioned upon the platform. This platform is movable between a lower steady state position and an upper position which is immediately below the neck holding means to facilitate receiving of bottles from the bottle suspension slots. A platform drive is operatively secured with respect to the platform to urge conflux movement thereof between the lower position and the upper position preferably simultaneously with movement of the neck holding means between the bottom and top positions, respectively.

Bottle sensing devices are positioned adjacent to the neck holding means and are adapted to sense full loading of the bottle suspension slots. These bottle sensing means are operatively connected to the carriage drive means and are responsive to filling of bottles within the bottle suspension slots to urge movement of the neck holding means from the top position to the bottom position.

A return sensing means is responsive to the neck holding means moving into the bottom position to urge the first and second suspension bars to move to the bottle releasing position and thereafter to urge the neck holding means to move back toward the upper position and to urge the platform and the bottles carried thereon to move to the lower position. Also the first and second suspension bars are adapted to return to the bottle holding position ready to receive bottles therein when the suspension carriage is positioned in the top position immediately adjacent the downstream end of the bottle guiding means.

Preferably the inner guiding edge and the outer guiding edge are arcuate to define a guiding channel therebetween of constant dimension but with a gradual curve inwardly such as to condense the lateral dimension of the array of bottles in a gradual manner to minimize any potential for damage to the neck area of the bottles. Once the bottles are moved inwardly the array will normally include abutment between all bottles and adjacent bottles.

The bottle sensing means preferably comprises a plurality of pneumatic contact switches which are connected in series with respect to one another and require a signal to be received by all such switches positioned adjacent to all of the downstream ends of the bottle suspension slots simultaneously in order to sense a full loaded condition of the suspension carriage and to initiate downward movement thereof.

The neck holding means itself further includes a first support rod fixedly secured with respect to each of the first suspension bars to be laterally movable therewith and a second support rod fixedly secured with respect to each of the second suspension bars in such a manner as to be laterally movable therewith. A support rod drive means is operably secured with respect to the first support and the second support rod to selectively urge movement of the first suspension bars and the second suspension bars simultaneously to the bottle holding position when moved together and to the bottle releasing position when moved apart.

The bottle packing apparatus of the present invention preferably further includes a vertical orientation means positioned between the neck holding means 2 and the platform means. This vertical orientation means includes side walls to facilitate vertical orientation of the downwardly moving bottles which are suspended from the bottle suspension slots during this downward movement. These side walls include an intermediate side wall area being generally vertical and an upper side wall area inclined upwardly and outwardly from the intermediate side walls. Furthermore the side walls can include a lower side wall area extending downwardly and outwardly from the lower edge of the intermediate side wall area. Preferably the side walls will extend about the outer periphery of the array of bottles to facilitate orientation thereof as they move downwardly and immediately prior to contact with the case or platform positioned therebelow.

It is an object of the present invention to provide a bottle packing apparatus in accordance with the present invention wherein maintenance costs are minimized.

It is an object of the present invention to provide a bottle packing apparatus in accordance with the present invention wherein noise is minimized by releasing the bottles after direct placement into the case located therebelow.

It is an object of the present invention to provide a bottle packing apparatus in accordance with the present invention wherein the number of moving parts is minimized.

It is an object of the present invention to provide a bottle packing apparatus in accordance with the present invention wherein initial cost and maintenance costs are minimized.

It is an object of the present invention to provide a bottle packing apparatus in accordance with the present invention wherein damaging to bottles including breakage or external marking is minimized.

It is an object of the present invention to provide a bottle packing apparatus in accordance with the present invention wherein placement is achieved by conflux movement comprising downward movement of the array of bottles and upward movement of the case on the platform simultaneously thereby minimizing cycle time, breakage and noise.

It is an object of the present invention to provide a bottle packing apparatus in accordance with the present invention wherein lateral dimensions are minimized.

It is an object of the present invention to provide a bottle packing apparatus in accordance with the present invention wherein efficient operation is achieved by the use of pneumatic controls.

It is an object of the present invention to provide a bottle packing apparatus in accordance with the present invention wherein lane dividers are eliminated from the packing head.

It is an object of the present invention to provide a bottle packing apparatus in accordance with the present invention wherein grippers are eliminated.

It is an object of the present invention to provide a bottle packing apparatus in accordance with the present invention wherein the dropping of bottles into a case positioned therebelow can be completely eliminated wherein vertical alignment between suspended bottles and the case positioned therebelow is maintained.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 2 is a top plan view of the configuration of FIG. 1 along lines 2—2;

FIG. 4 shows a side view of the suspension carriage as shown in FIG. 1 along lines 4—4.

DETAILED DESCRIPTION OF THE PREFERRED EMBODIMENT

Figure 1:
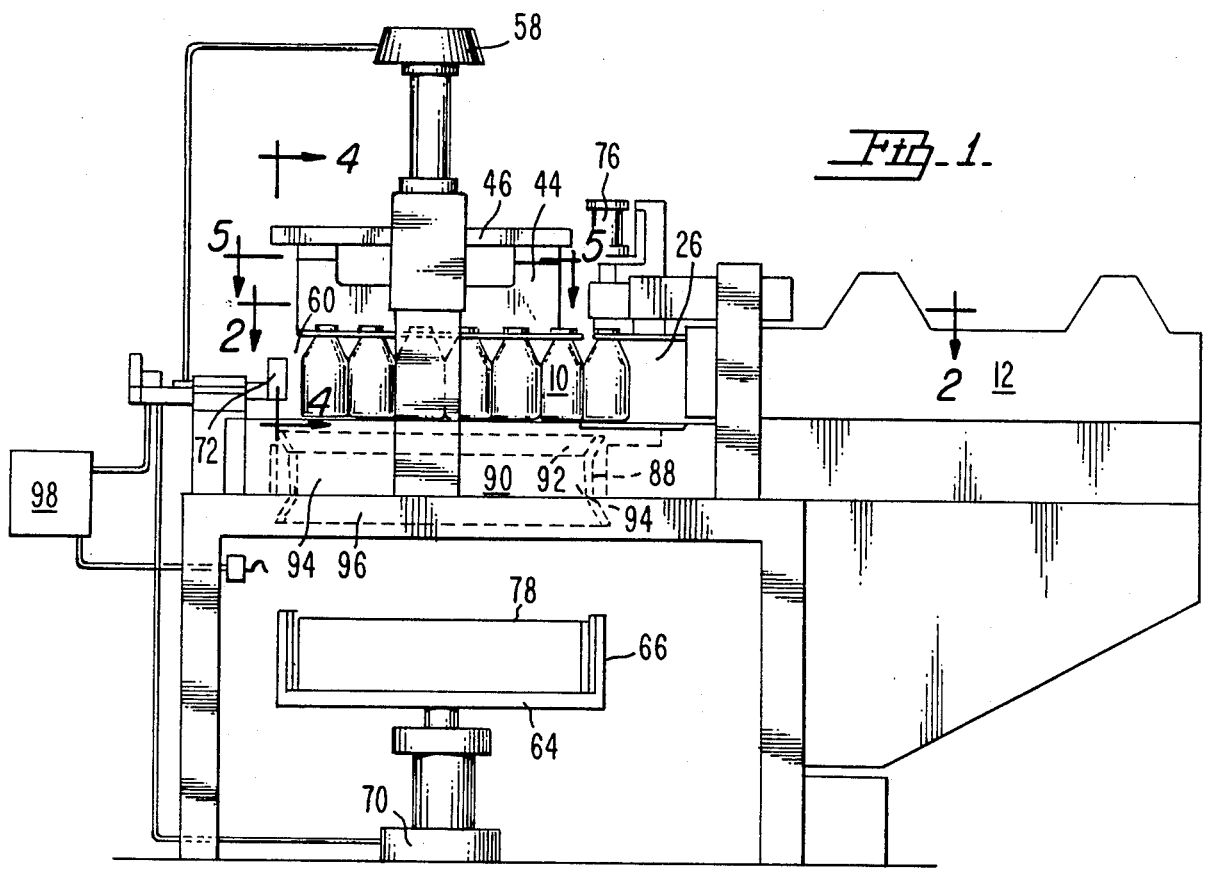
FIG. 1 is a side plan view of an embodiment of the bottle packing apparatus of the present invention.

The present invention provides a bottle packing apparatus including a bottle supply means 12 for supplying of randomly oriented bottles 10 traveling upon a conveyor means 14. A plurality of bottle divider means 18 is positioned above the conveyor means 14 at approximately the downstream end thereof. Bottle divider means 18 include individual divider members 20 extending longitudinally in the direction of movement of conveyor means 14 to define a plurality of rows 22 thereon.

A bottle guiding means 24 is positioned adjacent the downstream end 26 of bottle supply means 12 and provides a plurality of bottle guides 28 to compress the lateral packing dimension of the rows 22 of bottles 10.

Each bottle guide 28 includes a first plate means 30 extending outwardly from the outermost adjacent divider member 20. First plate means 30 includes an outer guiding edge 32 therealong adapted to abut bottles within the row corresponding to that specific bottle guide. A second plate means 34 extends generally horizontally outward from the inner divider member 20 defining the specific row 22 and includes an inner guiding edge 36. In this manner the outermost wall 38 and the innermost wall 40 of the two divider members 20 defining the specific row contain therebetween the first and second plate means 30 and 34 in such a manner that the outer guiding edge 32 and the inner guiding edge 36 thereof define a guiding channel 42 therebetween. This guiding channel is preferably of constant lateral dimension with the outer guiding edge 32 and the inner guiding edge 36 being parallel with respect to one another. Preferably also these two guiding edges are arcuate to urge gradual movement of bottles traveling through the bottle guiding means 24 inwardly toward the center line 16 of conveyor means 14 and bottle guiding means 24. With such a construction basically the guiding channels 42 are urging movement of the individual bottles inwardly to condense the lateral dimension of the array for packing.

The lateral dimension of the rows 22 is larger than desired due mainly to the thickness of the individual divider members 20 and any clearances which may be provided between the surface of bottles 10 and the inner walls of the dividers 20. Thus the inward guiding provided by guiding channel 42 eliminates these unnecessary dimensions and places the bottles 10 immediately adjacent to one another laterally and in virtual abutment laterally.

A neck holding means 44 includes a suspension carriage means 46 which is normally positioned in a top position 60 immediately adjacent the downstream end of bottle guiding means 24. A carriage drive means 58 is operable to move the neck holding means 44 and specifically the suspension carriage means 46 thereof between this top position 60 and a bottom position 62 vertically therebelow at which point the bottles can be released for packing.

Preferably the neck holding means 44 further includes a plurality of first suspension bars 48 and second suspension bars 50. These suspension bars define therebetween bottle suspension slots 52. The lateral dimension of these bottle suspension slots can be varied since the first suspension bars 48 and the second suspension bars 50 are laterally movable with respect to the suspension carriage 46. When bars 48 and 50 are at the minimum distance from each other they are in a bottle holding position with a dimension approximately equal to the lateral dimension of the guiding channels 42 of bottle guiding means 24. When the first suspension bars 48 and second suspension bars 50 are moved apart from one another they are moved to a bottle releasing position 56. To facilitate this control the first suspension bars 48 are each fixedly secured with respect to a first support rod 82. Similarly the second suspension bars 50 are all fixedly secured with respect to a second suspension rod 84. A support rod drive means 86 is operatively secured with respect to the first support rod 82 and the second support rod 84 to selectively cause movement thereof in such a manner as to move the first suspension bars 48 and the second suspension bars 50 between the bottle holding position 54 and the bottle releasing position 56 as desired.

Support rod drive means 86 is controlled such as to retain the suspension bars 48 and 50 in the bottle holding position 54 whenever the suspension carriage 46 is the top position 60. Support rod drive means 86 is also operable upon the suspension carriage 46 reaching the bottom position 62 to move the suspension bars 48 and 50 to the bottle releasing position 56 for release of the bottles 10 contained therein for packing.

A platform means 64 may be positioned vertically below the neck holding means 44 and is adapted to receive bottle packing cases 78 thereon if desired. Alternatively bottles could be placed directly on the platform but it is anticipated that normally cases 78 will be utilized.

The platform means 64 is operatively secured with respect to a platform drive 70 such as to be movable between a steady state lower position 66 and an upper position 68. When the platform means is in the upper position 66 a case 78 positioned thereon will be ready to receive bottles directly from the neck holding means 44 located thereabove.

The pneumatic controls of the present invention can be powered by a pneumatic source 98 which is operatively secured with respect to a bottle sensing means 72. Sensing means 72 preferably takes the form of a plurality of pneumatic contact switches 80 positioned immediately adjacent the downstream end of each bottle suspension slot 52 defined in the neck holding means 44.

When loading of the suspension carriage means 46 and specifically of the bottle suspension slots 52 is completed each pneumatic contact switch 80 located at the downstream end of each bottle suspension slot 52 will sense a loaded condition. Once all such pneumatic contact switches 80 are activated power will be provided to the carriage drive means 58 to urge movement of the suspension carriage means 46 toward the bottom position 62. Also at that time the bottle retaining means 76 will be activated to halt the movement of bottles laterally being received from the bottle supply means 12. Also the platform drive means 70 will be activated causing conflux upward movement of platform 64 and a case 78 located thereon toward the upper position 68 to facilitate positioning immediately below the neck holding means 44 to allow receiving of bottles 12 therefrom.

Figure 3:
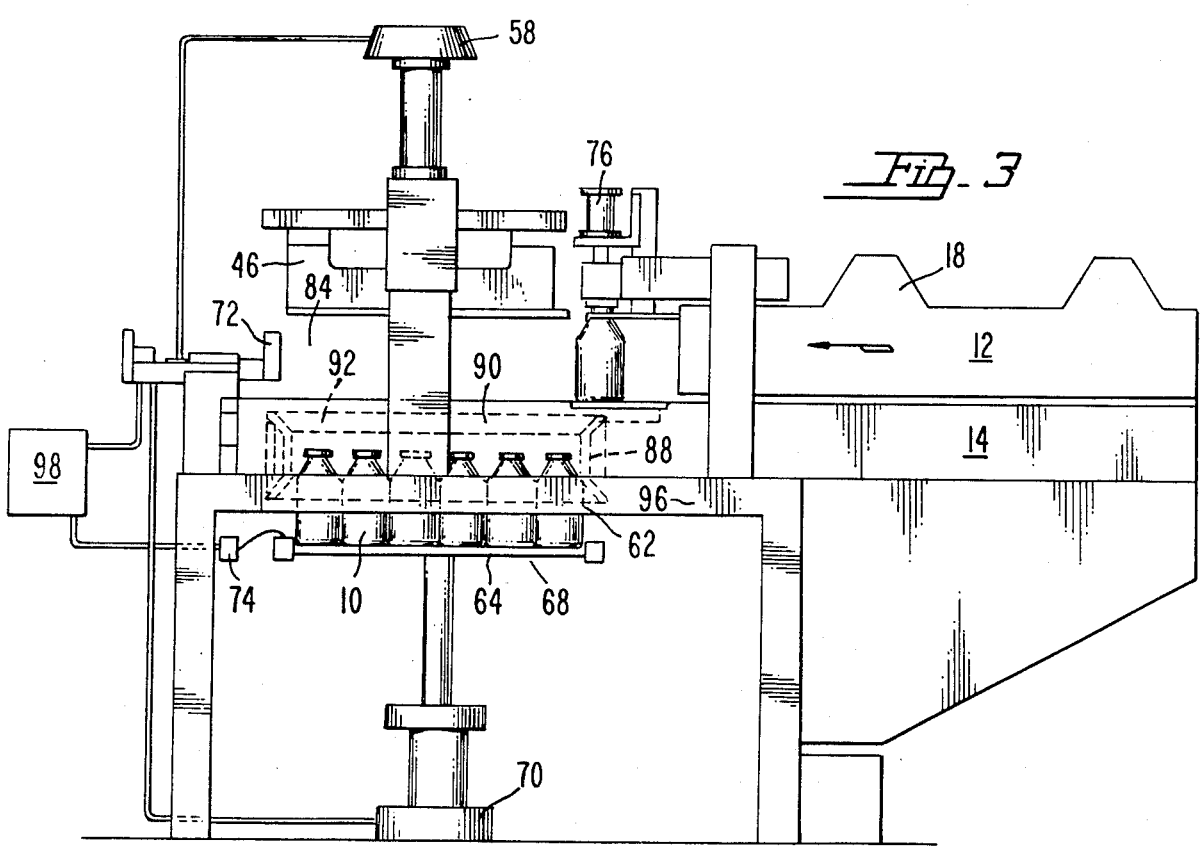
FIG. 3 is a side plan view of the embodiment shown in FIG. 1 with the platform in the upper position and the suspension carriage in the bottom position showing the bottles in the loaded position.
Figure 5:
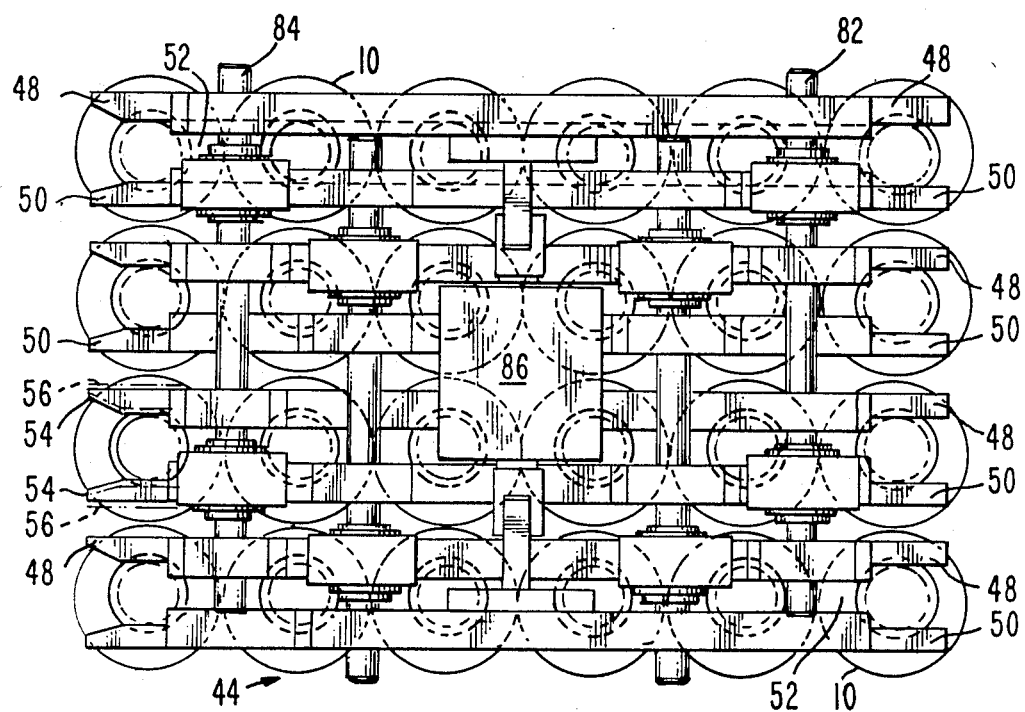
FIG. 5 is a top plan view of the suspension carriage shown in FIG. 1 along lines 5—5.

Once the suspension carriage means 46 has reached the bottom position 62 and the platform means 64 has reached the upper position 68, as shown best in FIG. 3, the bottles will be positioned directly in case 78. Preferably the bottles will actually have the bottoms thereof in contact with the case 78. Once this position as shown in FIG. 3 is achieved the return sensing means 74 will be activated causing initiation of operation of the support rod drive means 86 and movement of suspension bars 48 and 50 to the bottle releasing position 56. The bottles will thus be released however they will not fall. It is critical to note that there will be no falling or downward movement of the bottles once released. They will be placed into position within the case 78 or on the platform 64 prior to release thereof thereby virtually eliminating the noise of operation normally associated with bottle packing machines. After the suspension bars 48 and 50 are moved to the bottle releasing position 56 the platform drive means 70 will be activated causing downward movement of platform 64 to the steady state lower position 66 where conventional removal means can be utilized for removal of the configuration of packed bottles 10.

Also upon downward movement of platform 64 the carriage drive means 58 will be actuated causing upward movement of neck holding means 44 toward the top position 60. Also at this time the support rod drive means 86 will be actuated causing movement of the first and second suspension bars 48 and 60 to the bottle holding position 54 such as to be adapted to receive more bottles 10 from the bottle supply means 12. Once the suspension carriage 46 is in position to receive bottles adjacent the downstream end of the bottle guide means 24 the bottle retaining means 76 can be de-activated allowing movement of bottles downstream through the system again.

To facilitate the lateral orientation of bottles suspended downwardly from the bottle suspension slots 52 while the suspension carriage 46 is moving downwardly from the top position 60 to the bottom position 62 a vertical orientation means 88 may be positioned peripherally about the downward path of the array of bottles. Preferably this vertical orientation means 88 includes a side wall means 90 having intermediate side wall areas 94 extending generally vertically and upper side wall areas 92 extending upwardly and outwardly from the intermediate side wall areas. To further facilitate compacting of the array of bottles a lower side wall area 96 may be positioned extending downwardly and outwardly from the vertically extending intermediate side wall areas 94.

In this manner a system is provided which greatly minimizes noise by utilizing movement of both the packing head and the packing case simultaneously to an intermediate position. Also this greatly decreases the time of a given cycle and minimizes breakage.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:
1. A bottle packing apparatus comprising:
 (a) a bottle supply means comprising:
  (1) a conveyor means for carrying bottles to be packed, said conveyor means defining a center line extending longitudinally therealong;
  (2) bottle divider means comprising a plurality of divider members extending parallel to the direction of movement of said conveyor means and positioned thereabove to define a plurality of longitudinally extending rows of oriented bottles thereon;
 (b) bottle guiding means positioned at the downstream end of said bottle supply means, said bottle guiding means including a plurality of bottle guides positioned with one adjacent the downstream end of each of said longitudinally extending rows to receive bottles therefrom, each of said bottle guide means comprising:
  (1) a first plate means adjacent the wall of the outermost of said bottle divider means defining said row, said first plate means extending horizontally and defining an outer guiding edge thereadjacent spatially disposed from the outermost adjacent said bottle divider means;
  (2) a second plate means adjacent the wall of the innermost of said bottle divider means defining said row, said second plate means extending horizontally and defining an inner guiding edge thereadjacent spatially disposed from the innermost adjacent said bottle divider means, said inner guiding edge being positioned in spaced relation from and parallel to said outer guiding edge to define a guiding channel therebetween for receiving bottles and urging same toward said center line;
 (c) a neck holding means positioned adjacent the downstream end of said bottle guiding means to receive rows of bottles therefrom, said neck holding means comprising:
  (1) a suspension carriage means positioned adjacent said bottle guiding means and being vertically movable with respect thereto;
  (2) a plurality of first suspension bar means each being laterally movably mounted with respect to said suspension carriage means, each one of said first suspension bar means being positioned adjacent the downstream end of one of said guiding channels;
  (3) a plurality of second suspension bar means each being laterally movably mounted with respect to said suspension carriage means, each one of said second suspension bar means being positioned adjacent the downstream end of one of said guiding channels, each of said second suspension bar means cooperating with one of said first suspension bar means to define a plurality of bottle suspension slots adjacent the downstream ends of said guiding channels of said bottle guiding means to receive rows of bottles therefrom as said conveyor means urges bottles therealong, said first suspension bar means and said second suspension bar means being laterally movable toward and away from each other between a bottle holding position and a bottle releasing position, respectively;
 (d) a carriage drive means operatively mounted with respect to said suspension carriage means and said neck holding means to cause movement thereof between a top position with said bottle suspension slots adjacent the downstream ends of said guiding channels and a bottom position located vertically downward therefrom to facilitate releasing of bottles retained within said bottle suspension slots;
 (e) a platform means positioned below said suspension carriage means and adapted to receive bottles therefrom, said platform means being movable between a lower position and an upper position immediately below said neck holding means to receive bottles from said bottle suspension slots;
 (f) platform drive means operatively secured with respect to said platform means to urge movement thereof between the lower position and the upper position;
 (g) bottle sensing means adjacent to said neck holding means and being adapted to sense loading of said bottle suspension slots, said bottle sensing means being operatively connected to said carriage drive means and responsive to filling of bottles within said bottle suspension slots to urge movement of said neck holding means from the top position to the bottom position;

(h) return sensing means being responsive to said neck holding means moving into the bottom position to urge said first and second suspension bar means to the bottle releasing position and then to urge said neck holding means to move back toward the upper position, to urge said platform and the bottles carried thereon to move to the lower position and to urge said first and second suspension bar means to move to the bottle holding position ready to receive bottles therein;

(i) bottle retaining means positioned adjacent the downstream end of said bottle guiding means and adapted to selectively cease movement of bottles through said bottle guiding means responsive to said neck holding means being in any position other than the top position and to allow movement of bottles through said bottle guiding means responsive to said neck holding means being in the top position.

2. The bottle packing apparatus as defined in claim 1 wherein said platform drive means and said carriage drive means are operatively controlled with respect to one another for simultaneous movement of said platform means to the upper position and said neck holding means to the bottom position to facilitate conflux movement therebetween.

3. The bottle packing apparatus as defined in claim 1 wherein said inner guiding edge and said outer guiding edge are arcuate and parallel therealong within said guiding channel being of a constant lateral dimension therealong.

4. The bottle packing apparatus as defined in claim 1 wherein said platform means is movable vertically between an upper position and a steady state lower position.

5. The bottle packing apparatus as defined in claim 1 wherein said bottle guiding means urges bottles inwardly toward said center line sufficiently to cause abutment between adjacent bottles.

6. The bottle packing apparatus as defined in claim 1 wherein the bottles retained by said neck holding means are urged downward to abutment with a case positioned upon said platform prior to release of the bottles by movement of said first suspension bar means and said second suspension bar means to the bottle releasing position.

7. The bottle packing apparatus as defined in claim 1 wherein said bottle retaining means is operatively connected to said bottle sensing means to be responsive to full loading of said bottle suspension slots to initiate retaining of bottles carried upon said conveyor means.

8. The bottle packing apparatus as defined in claim 7 wherein said bottle retaining means is responsive to return of said neck holding means to the top position to cease retaining of movement of bottles carried upon said conveyor means.

9. The bottle packing apparatus as defined in claim 1 wherein said bottle sensing means comprises a plurality of normally open pneumatic contact switches, one of said switches being positioned adjacent the downstream end of each of said bottle suspension slots.

10. The bottle packing apparatus as defined in claim 9 wherein said pneumatic contact switches are connected pneumatically in series to generate a fully loaded signal only responsive to closing of all pneumatic contact switches simultaneously.

11. The bottle packing apparatus as defined in claim 1 wherein said neck holding means further comprises:

(a) a first support rod fixedly secured with respect to each of said first suspension bar means to be laterally movable together with respect to said suspension carriage means;

(b) a second support rod fixedly secured with respect to each of said second suspension bar means to be laterally movable together with respect to said suspension carriage means; and (c) support rod drive means operably secured with respect to said first support rod and said second support rod to selectively urge movement of said first suspension bar means and said second suspension bar means together to the bottle holding position and apart to the bottle releasing position.

12. The bottle packing apparatus as defined in claim 11 wherein said support rod drive means is pneumatically controlled.

13. The bottle packing apparatus as defined in claim 1 wherein said first suspension bar means and said second suspension bar means are adapted to retain bottles in the neck area thereof with the body of the bottles suspended therebelow.

14. The bottle packing apparatus as defined in claim 1 wherein said bottle suspension slots are straight and parallel with respect to one another.

15. The bottle packing apparatus as defined in claim 1 wherein the lower position of said platform means is in the steady state position.

16. The bottle packing apparatus as defined in claim 1 wherein said platform is adapted to receive bottle cases positioned thereon to facilitate receiving of bottles from said neck holding means.

17. The bottle packing apparatus as defined in claim 1 further comprising a vertical orientation means positioned between said neck holding means and said platform means, said vertical orientation device including side wall means to facilitate vertical orientation of the downwardly moving bottles suspended from said bottle suspension slots.

18. The bottle packing apparatus as defined in claim 17 wherein said side wall means includes an intermediate side wall area being generally vertical and an upper side wall area inclined upwardly and outwardly from said intermediate side wall area.

19. The bottle packing apparatus as defined in claim 18 further including a lower side wall area extending downwardly and outwardly from said intermediate side wall area.

20. A bottle packing apparatus comprising:

(a) a bottle supply means comprising:

(1) a conveyor means for carrying bottles to be packed, said conveyor means defining a center line extending longitudinally therealong;

(2) bottle divider means comprising a plurality of divider members extending parallel to the direction of movement of said conveyor means and positioned thereabove to define a plurality of longitudinally extending rows of oriented bottles thereon;

(b) bottle guiding means positioned at the downstream end of said bottle supply means, said bottle guiding means including a plurality of bottle guides positioned with one adjacent the downstream end of each of said longitudinally extending rows to receive bottles therefrom, each of said bottle guide means oomprising:

(1) a first plate means adjacent the wall of the outermost of said bottle divider means defining said row, said first plate means extending horizontally and defining an outer guiding edge thereadjacent being arcuate and spatially disposed from the outermost adjacent said bottle divider means;

(2) a second plate means adjacent the wall of the innermost of said bottle divider means defining said row, said second plate means extending horizontally and defining an inner guiding edge thereadjacent being arcuate and spatially disposed from the innermost adjacent said bottle divider means said inner guiding edge being positioned in spaced relation from and parallel to said outer guiding edge to define a guiding channel therebetween for receiving bottles and urging same toward said center line and into abutment with respect to each other, said guiding channel being arcuate and of constant lateral dimension;

(c) a neck holding means positioned adjacent the downstream end of said bottle guiding means to receive rows of bottles therefrom, said neck holding means comprising:

(1) a suspension carriage means positioned adjacent said bottle guiding means and being vertically movable with respect thereto;

(2) a plurality of first suspension bar means each being laterally movably mounted with respect to said suspension carriage means, each one of said first suspension bar means being positioned adjacent the downstream end of one of said guiding channels;

(3) a plurality of second suspension bar means each being laterally movably mounted with respect to said suspension carriage means, each one of said second suspension bar means being positioned adjacent the downstream end of one of said guiding channels, each of said second suspension bar means cooperating with one of said first suspension bar means to define a plurality of straight and parallel bottle suspension slots adjacent the downstream ends of said guiding channels of said bottle guiding means to receive rows of bottles therefrom as said conveyor means urges bottles therealong, said first suspension bar means and said second suspension bar means being laterally movable toward and away from each other between a bottle holding position and a bottle releasing position, respectively, said bottle suspension slots adapted to receive the neck area of the bottles suspended therefrom;

(4) a first support rod fixedly secured with respect to each of said first suspension bar means to be laterally movable together with respect to said suspension carriage means;

(5) a second support rod fixedly secured with respect to each of said second suspension bar means to be laterally movable together with respect to said suspension carriage means;

(6) support rod drive means being pneumatically controlled and operably secured with respect to said first support rod and said second support rod to selectively urge movement of said first suspension bar means and said second suspension bar means together to the bottle holding position and apart to the bottle releasing position;

(d) a carriage drive means operatively mounted with respect to said suspension carriage means and said neck holding means to cause movement thereof between a top position with said bottle suspension slots adjacent the downstream ends of said guiding channels and a bottom position located vertically downward therefrom to facilitate releasing of bottles retained within said bottle suspension slots;

(e) a platform means positioned below said suspension carriage means and adapted to retain a case thereon adapted to receive bottles from said suspension carriage means, said platform means being vertically movable between a lower steady state position and an upper position immediately below said neck holding means to receive bottles from said bottle suspension slots;

(f) platform drive means operatively secured with respect to said platform means to urge movement thereof between the lower position and the upper position;

(g) bottle sensing means adjacent to said neck holding means and being adapted to sense loading of said bottle suspension slots, said bottle sensing means being operatively connected to said carriage drive means and responsive to filling of bottles within said bottle suspension slots to urge movement of said neck holding means from the top position to the bottom position, said bottle sensing means comprising a plurality of normally open pneumatic contact switches, one of said switches being positioned adjacent the downstream end of each of said bottle suspension slots;

(h) return sensing means being responsive to said neck holding means moving into the bottom position to urge said first and second suspension bar means to the bottle releasing position and then to urge said neck holding means to move back toward the upper position, to urge said platform and the bottles carried thereon to move to the lower position and to urge said first and second suspension bar means to move to the bottle holding position ready to receive bottles therein;

(i) bottle retaining means positioned adjacent the downstream end of said bottle guiding means and adapted to selectively cease movement of bottles through said bottle guiding means responsive to said neck holding means being in any position other than the top position and to allow movement of bottles through said bottle guiding means responsive to said neck holding means being in the top position, said bottle retaining means being operatively connected to said bottle sensing means to be responsive to full loading of said bottle suspension slots to initiate retaining of bottles carried upon said conveyor means, said bottle retaining means being responsive to return of said neck holding means to the top position to cease retaining of movement of bottles carried upon said conveyor means; and (j) a vertical orientation means positioned between said neck holding means and said platform means, said vertical orientation device including side wall means to facilitate vertical orientation of the downwardly moving bottles suspended from said bottle suspension slots, said side wall means comprising:

(1) an intermediate side wall area being generally vertical;

(2) an upper side wall area inclined upwardly and outwardly from said intermediate side wall area; and (3) a low side wall area extending downwardly and outwardly from said intermediate side wall area.

* * * * *